United States Patent [19]

Blaylock

[11] Patent Number: 5,185,929
[45] Date of Patent: Feb. 16, 1993

[54] PECAN CRACKER

[76] Inventor: William R. Blaylock, 187 McCall St., Nashville, Tenn. 37211

[21] Appl. No.: 886,867

[22] Filed: May 22, 1992

[51] Int. Cl.⁵ .............................................. A47J 43/26
[52] U.S. Cl. .................................................. 30/120.4
[58] Field of Search ...................... 30/120.2, 120.5, 125, 30/324, 326, 328

[56] References Cited

FOREIGN PATENT DOCUMENTS 285836 7/1915 Fed. Rep. of Germany ..... 30/120.3
829741 1/1952 Fed. Rep. of Germany ..... 30/120.3

*Primary Examiner*—Douglas D. Watts
*Attorney, Agent, or Firm*—Dennison, Meserole, Pollack & Scheiner

[57] ABSTRACT

A nut cracker having a pair of opposed jaws with facing elongate concavities pivotally movable between open and closed positions about a pivot axis parallel to the longitudinal extend of the jaws. The concavities are smooth surfaced and the jaws manipulated by a pair opposed handle portions each rigid with one of the jaws and to the opposite side thereof from the pivot axis.

8 Claims, 1 Drawing Sheet

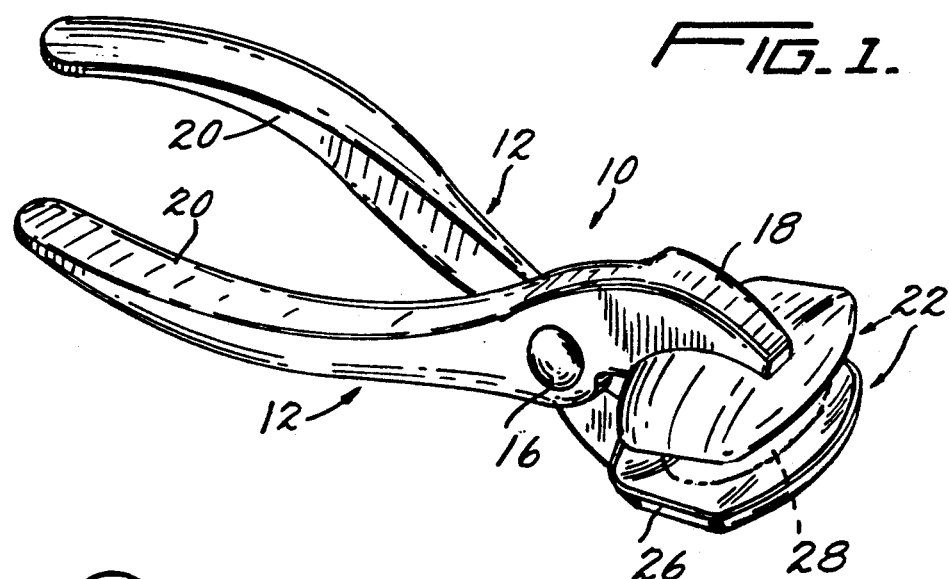
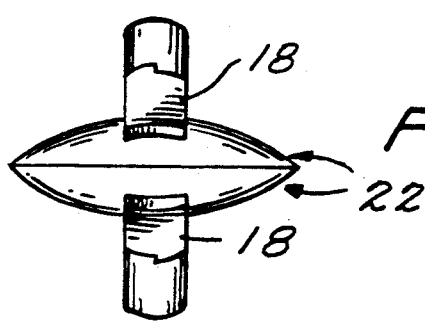
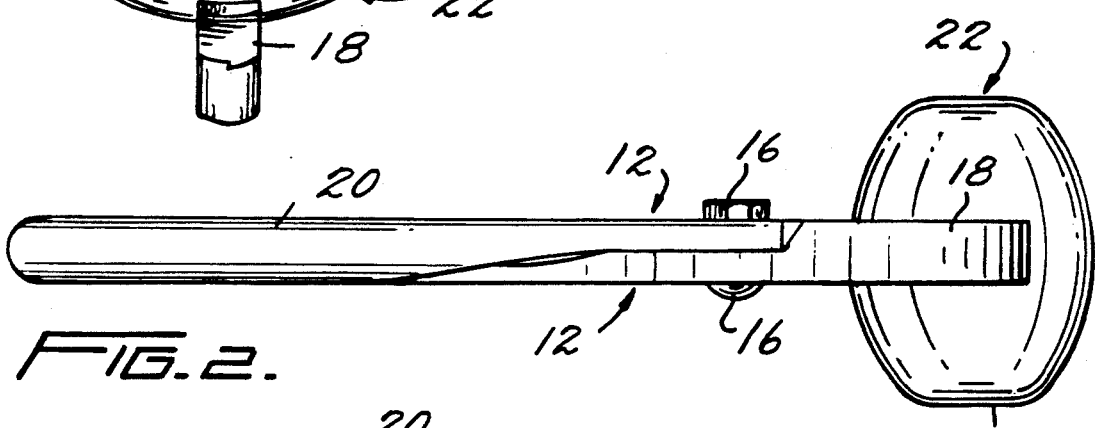
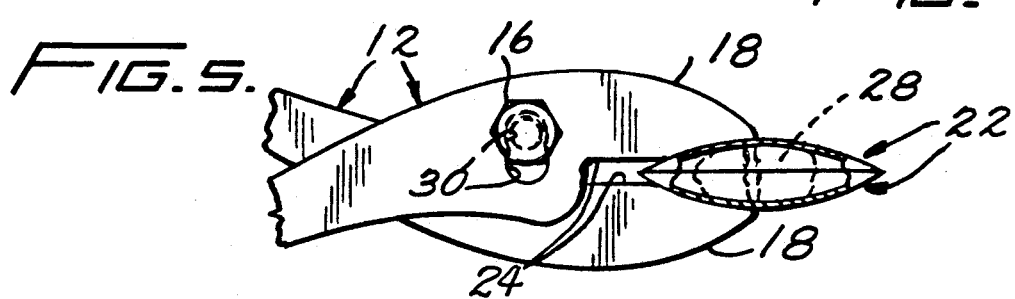

PECAN CRACKER

BACKGROUND OF THE INVENTION

Nut crackers for use by individuals to crack the relatively hard shell of nuts to access the meat therein are well known and provided in a variety of ornamental shapes and operative embodiments.

Known nut crackers include a basic mallet and anvil, screw-type force applicators, and most commonly, handle manipulated pivoted jaws which receive a nut therebetween and crush the shell as the handles are drawn together.

As will be appreciated by anyone familiar with conventional nut crackers, problems are frequently encountered in their use. Such problems include an incomplete cracking of the shell, the application of excess force resulting in a destructive crushing of the meat within the shell, difficulty in positioning and retaining the nut during the cracking operation, a scattering of the residue of the cracked nut, and the like.

An apparent attempt to at least avoid the problem of a scattering of the residue of the cracking operation will be noted in a German patent document in the name of Voigtlander, bearing the No. 285,836, and the date Jul. 15, 1915. The disclosed cracker in this document incorporates a pair of opposed hemispherical covers which mount over the cracking jaws and close thereover either independently of the movement of the jaws or in conjunction with the manipulation of the handles. The actual cracking of the nut is apparently performed by conventional opposed narrow jaws.

SUMMARY OF THE INVENTION

The nut cracker of the present invention is of the pivoted jaw type and is particularly adapted for the cracking of pecans, a nut of generally elongate elliptical shape with a rather thin shell and easily crushed meat.

It is a particularly significant object of the invention to provide a nut cracker which will effectively crack the shell for access to the meat without a crushing of the meat. In conjunction therewith, it is significant that the jaws of the cracker are adapted to apply substantially equal pressure, in a controlled manner, along the entire elongate length of the nut, specifically a pecan, to ensure the controlled cracking of the shell.

It is also a significant object of the invention to provide a nut cracker wherein provision is made, without excess structure or accessory type components, for the complete containment of the cracked nut to avoid a scattering of the nut elements after cracking.

Other objects of the invention include the provision of jaws which are substantially self cleaning and wherein, after the cracking operation, a lower one of the jaws can retain the cracked nut in the manner of an open receptacle until such time as the nut is removed therefrom.

The objects of the invention are achieved by the provision of a nut cracker including a pair of crossing elongate arms pivotally joined and having head portions and elongate handle portions to the opposite sides of the pivot means, with opposed jaws mounted to the head portions.

The jaws are transversely elongate, extending in a longitudinal direction parallel to the pivot axis with each of the jaws being of a concavo-convex configuration having the concavities in opposed facing relationship. The concavities define smooth surfaces of a maximum depth at the longitudinal and transverse centers thereof, basically conforming in configuration to the elongate generally elliptical configuration of pecans which are to be longitudinally positioned within the jaws.

The head end portions of the arms are affixed to the respective outer surfaces of the jaws on the transverse center line thereof and in alignment with each other to apply a directly opposed bearing force during the cracking operation.

The jaws are duplicates of each other and, when closed, have the corresponding peripheral edge portions thereof engaged or closely positioned to define an interior chamber of a height and elongate configuration sufficient to accommodate the nut without a crushing of the nut meat.

The orientation of the jaws, and hence the nut to be cracked, along an axis parallel to the pivot axis of the jaws provides for a substantially simultaneous application of the cracking force of the jaws along the entire length of the nut for an equalization of the pressure thereon and a controlled cracking of the shell in a manner which minimizes damage to the meat therein. The smooth inner surfaces of the jaws allow for a slight internal adjusting and centering of the smooth shelled pecan as the jaws are brought together to further enhance the equalization of the pressure on the received nut.

Additional features and advantages of the invention will become apparent from the more detailed description of the invention following hereinafter.

BRIEF DESCRIPTION OF THE DRAWINGS

FIG. 1 is a perspective view of the nut cracker with the jaws open;

FIG. 2 is a top plan view of the closed nut cracker;

FIG. 3 is a front elevational view of the closed nut cracker;

FIG. 4 is a side elevational view of the forward end of the nut cracker partially opened to receive a nut therein; and FIG. 5 is an elevational view of the opposite side of the forward portion of the nut cracker, partially in section, and with the jaws closed to crack the received nut.

DESCRIPTION OF PREFERRED EMBODIMENT

Referring now more specifically to the drawings, the nut cracker 10 includes a pair of substantially duplicate elongate arms 12 crossing each other and pivotally joined by a transverse pivot pin 14 with enlarged retaining heads 16 affixed to the opposite ends thereof and bearing against the outer faces of the arms 12. One such enlarged head 16 can be in the nature of nut adjustably mounted the threaded end of the pivot shaft 14.

The arms 12 extend forward of the pivot axis defined by the pivot pin 14 and form overlying head portions 18, and rearward of the pivot axis a substantially greater distance to define overlying handles 20.

A pair of duplicate concavo-convex jaws 22 are respectively fixed to the two head portions 18 with the concavities thereof in overlying facing relation to each other in the closed position of the jaws. The jaws 22 extend transverse of the head portions 18 and in a longitudinal direction parallel to and spaced forward of the pivot axis defined by the pivot pin 14. The head portions 18 engage the respective jaws 22 midway along the length thereof and on the transverse center line of the jaws in aligned relation to each other whereby the application of the closing forces on the jaws by the head portions are in direct opposition to each other.

Noting the elevational views of 4 and 5 in particular, it will be seen that the inner edges 24 of the head portions are recessed relative to the peripheral edges of the jaws 22 to avoid any interference with the full closing of the jaws on each other, such closing movement being ultimately limited by engagement of the peripheral edge portions of the two jaws 22.

As will be appreciated from the drawings, the jaws are basically of an elongate elliptical or ellipsoidal configuration with slightly truncated opposed longitudinal ends 26. The facing surfaces of the two concavities of the jaws 22 are smooth and continuously tapering from the peripheral edges of the respective jaws to a maximum depth substantially at the longitudinal and transverse center points of the jaws 22.

The elliptical nature of the jaws 22, and in particular the concavities therein are significant in generally conforming the jaws to pecans, designated by reference numeral 28 in selected views. The pecan itself conventionally has an elongate elliptical configuration with a smooth surfaced shell. As such, the pecan will be accommodated longitudinally within the jaw concavities, and through the cooperating smooth surfaces of the nut and concavities, will tend to automatically adjust for maximum engagement with the jaws as the jaws are brought together to crack the nut. It will also be recognized that as the jaw-received nut is positioned parallel to the pivot axis of the jaws, the pressure of the jaws on the nut will tend to be equalized along the length thereof, providing a controlled cracking of the shell along this length, as opposed to a localized cracking of the shell as occurs in the conventional nut cracker.

Noting the sectional detail in FIG. 5, it will be recognized that the depth of the cavity defined by the completely closed jaws will be such as to, while ensuring an effective cracking of the shell, not unduly crush or destroy the smaller meat component therein. It is of course recognized that some compacting of the meat may occur depending upon the size of the pecan. In this regard, inasmuch as the nut is simultaneously cracked along the length thereof, and as the cracking operation will be readily visible to the user of the device, the actual cracking operation can be effectively controlled and terminated prior to a complete closing of the jaws on each other should the desired cracking of the shell be achieved prior to that point.

After a completion of the cracking operation, and with the jaws positioned horizontally, the upper jaw can be retracted with the lower jaw acting in the manner of an upperwardly opening tray containing the cracked nut for manual removal and separation of the shell from the meat. Alternatively, the jaws can be opened and the nut merely dumped therefrom. As will be appreciated, the smooth inner faces of the jaws provide for what amounts to a self-cleaning of the jaws with the nut material easily sliding therefrom.

It will also be recognized that the concave nature of the jaws 22 provide an effective means to retain the nut material against any tendency for the material to scatter or fall as the nut is being cracked. This will particularly be the case in those situations wherein the jaws completely close during the cracking operation.

With continued reference to FIG. 5, it is also contemplated that a degree of adjustability be provided wherein the operating distance between the jaws 22 can be increased to accommodate larger than normal nuts, pecans in particular. This can be easily effected by the provision of the near arm 12 with dual pivot apertures 30 communicating through a reduced neck portion 32 through which the pivot pin 14 can be laterally shifted to vary the vertical distance between the jaws 22. When so adjusted to achieve maximum space in between the jaws, it will be recognized that the jaws, in their maximum closed position, will not have the opposed peripheral edge portions fully engaged. Nevertheless, all of the aforedescribed advantages of the invention will be achieved.

Noting FIG. 1, it will be seen that the elongate handles 20 extend generally parallel to each other with the spacing therebetween being such as to allow for an easy manual grasping and manipulation of the nut cracker 10 by a single hand.

Noting FIGS. 2 and 3, it will be seen that the arms 12 are positioned with the head portions 18 and handles aligning with each other. As such, the mid-portions of each of the arms 12, along those lengths wherein the arms cross and are pivotally joined, are of a width approximately equal to one half the width of the head portions and handles so as to laterally nest within each other to maintain the desired alignment between the two head portions and between the two handles.

From the foregoing, it will be appreciated that the nut cracker of the invention is unique in its ability to crush nuts of an elongate elliptical configuration, such as pecans, in a manner which safely secures the nut during the cracking operation and which effects the cracking in a controlled manner which substantially eliminates damage to the nut meat itself. In addition, the nut cracker both contains the cracked nut at the completion of the operation and is self cleaning.

The foregoing is considered illustrative of the features of the invention and not as a limitation on the scope of the invention. Rather, the invention is only to be limited by the scope of the claims following hereinafter.

I claim:

1. A nut cracker comprising a pair of cooperating jaws, each jaw having an elongate outwardly opening concavity therein surrounded by a peripheral jaw edge portion, a pair of elongate manipulating arms mounting said pair of jaws in opposed overlying relation to each other with the concavities of the jaws in aligned facing relationship for reception of a nut therebetween, said elongate concavities extending in a common direction and including a major axis and a minor axis, said arms crossing each other at a common point along said arms, means adjustably pivotally joining said arms and defining a pivot axis at said common point, said arms forming head portions to one side of said pivot axis and handles to the opposite side of said pivot axis, the major axis of said jaws extending transversely relative tot he longitudinal axis of said arms with said common major axis of said elongate concavities being parallel to said pivot axis, said head portions being fixed to the respective jaws transversely to said longitudinal direction of the corresponding concavities and centrally thereof, said handles comprising means for pivotally moving said jaws about said pivot axis between a closed position for the confining and cracking of a nut therebetween, and an open position for the introduction and removal of a nut.

2. The nut cracker of claim 1 wherein the peripheral edge portions of said jaws closely overlie each other in the closed position of said jaws, with said jaws defining a confining chamber formed by said concavities.

3. The nut cracker of claim 2 wherein each concavity is smooth surfaced and continuously curving, both in the longitudinal direction and transverse thereto, from a minimum depth at said peripheral edge to a maximum depth at the longitudinal and transverse center of said concavity.

4. The nut cracker of claim 3 including a pair of elongate manipulating arms crossing each other at a common point along said arms, said pivot axis being defined at said common point, said arms forming head portions to one side of said pivot axis and handles to the opposite side of said pivot axis, said head portions comprising said means for mounting said jaws, said head portions being fixed to the respective jaws along the transverse centers of the corresponding concavities and in overlying alignment with each other, said handles comprising said means for pivotally moving said jaws.

5. The nut cracker of claim 4 including means for laterally adjusting the position of said pivot axis relative to said arms to vary the pivotal movement of said jaws.

6. The nut cracker of claim 4 wherein said jaws are each of a concavo-convex configuration.

7. The nut cracker of claim 1 wherein each concavity is smooth surfaced and continuously curving, both in the longitudinal direction and transverse thereto, from a minimum depth at said peripheral edge to a maximum depth at the longitudinal and transverse center of said concavity.

8. The nut cracker of claim 1 wherein said jaws are each of a concavo-convex configuration.

* * * * *